United States Patent [19]
Rosin

[11] 4,134,650
[45] Jan. 16, 1979

[54] DISTRIBUTED-OPTICAL MICROFICHE READER

[75] Inventor: Seymour Rosin, Massapequa Park, N.Y.

[73] Assignee: Izon Corporation, Stamford, Conn.

[21] Appl. No.: 774,545

[22] Filed: Mar. 4, 1977

[51] Int. Cl.$^2$ .................... G03B 23/02; G03B 21/06
[52] U.S. Cl. .................................... 353/27 R; 353/38
[58] Field of Search ............. 353/38, 25, 27 R, 27 A, 353/102, 120, 121, 122

[56] References Cited
U.S. PATENT DOCUMENTS

| | | | |
|---|---|---|---|
| 3,712,724 | 1/1973 | Pratt | 353/38 |
| 3,864,034 | 2/1975 | Yevick | 353/38 |

*Primary Examiner*—Harry N. Haroian
*Attorney, Agent, or Firm*—Michael Ebert

[57] ABSTRACT

A reader for a distributed-optical microfiche wherein each page of recorded intelligence is constituted by a reduced scale image that is dissected to form a pattern of dispersed bits. The several patterns representing the recorded pages are interlaced to produce a multi-page microfiche that is read back by irradiating and enlarging only a selected pattern of dispersed bits and projecting this pattern onto a screen. The reader includes a lens matrix formed by an array of individual lenslets, each optically aligned with a respective bit in the selected pattern to enlarge and project this bit onto a screen zone. Interposed between the lens matrix and the screen is an apertured melding mask having an array of openings corresponding to the array of lenslets and optically aligned therewith. The diameter of each mask opening relative to that of the associated lenslet aperture and the distance between the mask opening and the lenslet are such that the illuminated screen zones associated with each triad of directly adjacent lenslets are in overlapping relationship to produce substantially equal light intensities within the overlapping and non-overlapping regions therein, thereby uniformly illuminating the screen.

6 Claims, 6 Drawing Figures

DISTRIBUTED-OPTICAL MICROFICHE READER

BACKGROUND OF INVENTION

This invention relates generally to distributed-optical microfiche readers, and more particularly to a reader of this type that includes an apertured melding mask adapted to effect uniform illumination of the selected image projected on the screen.

In a conventional microfiche storage and retrieval system, individual frames each bearing a reduced scale image of a single document or page of stored intelligence are arranged in a grid formation on a single record sheet or card. This species of microfiche requires a reader in which a selected frame on the microfiche is illuminated and aligned with a single-axis optical system for projection onto a viewing screen.

A single-axis optical system reader has a number of inherent limitations including the need for a minimum of 12 to 17 inches projection distance from the lens to the screen. This materially restricts the potential for reader size and weight reduction. But even if a reader for a conventional microfiche could be made more compact, it is subject to hotspot overlighting at the center of the screen. This nonuniformity in screen illumination causes eye fatigue, it dictates relatively high power inputs and thereby generates troublesome amounts of heat. Moreover, image resolution and lighting at the corners of the viewing screen are degraded.

The limitations characteristic of conventional microfiche readers have arrested the spread of micrographic technology into many application areas that require portability, maximum user convenience and image readability unaccompanied by eye fatigue.

The serious drawbacks inherent in existing types of microfiche readers have in large measure been overcome by a distributed-optical information storage and retrieval system of the type disclosed in the Waly U.S. Pat. No. 3,704,068 and in the Yevick U.S. Pat. Nos. 3,907,420 and 3,864,034, among others, all of which are assigned to the same assignee as the instant application.

In a distributed-optical information storage and retrieval system, the pages of data or intelligence are not recorded in discrete frames as in a conventional microfiche, but are dissected and interlaced thereon to produce a multipage record which is read back by enlarging only that pattern of dispersed characters or bits which together constitute the data of the single recorded page selected for projection.

Instead of a single-axis optical system, use is made of an array of individual lenslets (at least 500) which function in parallel, each serving only its own small cell or zone on the viewing screen. Because each individual lenslet acts to project only a tiny piece of the total image onto a respective zone, the projection distance to the screen is reduced to little more than an inch. Thus the dimensions and weight of the reader can be made to be no greater than that of an average telephone book, thereby affording both full portability and the convenience of either a desk top or lap reader.

In a distributed-optical reader of the type disclosed in the above-identified patents, the microfiche is placed in parallel relation to a lens matrix having an array of lenslets each of which is aligned with a respective bit of information on the microfiche to enlarge and project this bit onto a respective screen zone. In some instances, the lens matrix and the microfiche are integrated to form a unitary structure.

Illumination of the microfiche is effected by a cluster of fiber optic light pipes whose inputs are all irradiated by a common light source and whose outputs are in registration with the optical axes of the array of lenslets so that each optical path in the distributed optical system is separately illuminated. Interposed between the lens matrix and the screen and parallel therewith is an apertured mask acting to inhibit the overlap of adjacent information.

In a distributed-optical reader of this type, the light inputs to the several lenslets in the array are of about equal intensity. Consequently, the aggregate light fluxes in the related screen zones are substantially equal. But the intensity of light at any one point within a given zone, say, at zone center, is quite different from the light intensity at a point displaced from center. These zonal differences are governed by certain factors which will be later analyzed.

Hence while a distributed-optical microfiche reader of the type heretofore known does not suffer from hot spot overlighting at the center of the screen and all its attendant disadvantages, the screen lighting is not uniform and the illuminated image on the screen has a honeycomb appearance in which each illuminated cell or zone is separately discernible, rather than an image having a uniformly-illuminated seamless form. This honeycomb appearance, which is attributable to the lack of uniform light intensity within each zone forming the total image, though it does not seriously impair the readability of the image, is nevertheless distracting and constitutes a disturbing imperfection.

SUMMARY OF INVENTION

In view of the foregoing, it is the main object of this invention to provide a distributed-optical microfiche reader which produces a uniformly-illuminated screen image in substantially seamless form, even though the screen image is composed of separately-illuminated individual zones.

More particularly, an object of the invention is to provide a reader of the above-type which includes an apertured melding mask that not only serves to inhibit overlap of information but also functions to bring about substantially equal light intensity at every point in the array of zones forming the total screen image.

Briefly stated, these objects are attained in a distributed-optical microfiche reader provided with a lens matrix formed by an array of equidistant individual lenslets, each optically in registration with a respective bit of information in the dissected image pattern selected for projection onto a screen. Each lenslet is separately irradiated and serves to enlarge the related bit and to project it onto a respective screen zone.

Interposed between the lens matrix and the screen is an apertured melding mask having an array of openings corresponding to the array of lenslets and optically aligned therewith. Each irradiated lenslet produces a bundle of rays that is limited by the lenslet aperture, the diameter of the mask opening relative to that of the lenslet aperture and the distance between the opening and the lenslet being such that the illuminated screen zones associated with each triad of directly adjacent lenslets are in overlapping relationship to produce substantially equal light intensities within the overlapping and non-overlapping regions therein, thereby uniformly illuminating the screen.

OUTLINE OF DRAWINGS

For a better understanding of the invention as well as other objects and further features thereof, reference is made to the following detailed description to be read in conjunction with the accompanying drawings, wherein:

FIG. 1 schematically illustrates a distributed-optical microfiche reader which includes a melding mask in accordance with the invention;

DESCRIPTION OF INVENTION

Figure 1:
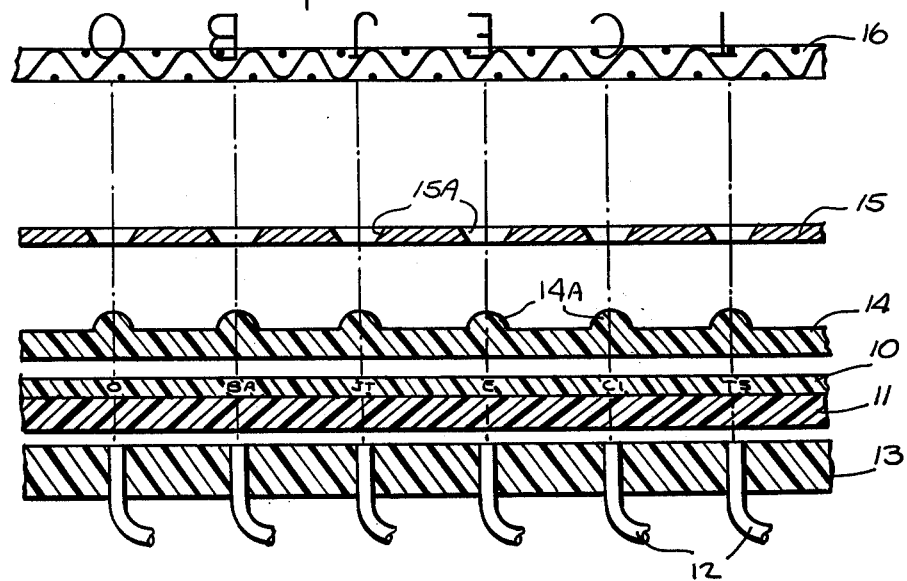

Referring now to FIG. 1, there is shown a distributed-optical microfiche reader in accordance with the invention for projecting a selected image recorded on a multi-image microfiche. The microfiche is formed by a photographic emulsion 10 carried on a transparent plate 11 made of clear plastic such as methyl methacrylate. The physical form of the distributed-optical microfiche forms no part of the present invention which is directed to a reader usable with any of the microfiche structures disclosed in the patents assigned to the assignee herein.

Illumination is provided by a cluster of fiber optic light-conducting tubes or pipes 12 whose input terminals are all irradiated by a common light source (not shown) and whose output terminals are supported by a base plate 13 disposed in parallel relation to the microfiche carrier plate 14, whereby each light output terminal lies in registration with a respective optical axis of the distributed optical projection system.

The distributed-optical system is constituted by a lens matrix 14 and a planar melding mask 15 parallel thereto. The upper surface of lens matrix 14, which may be molded or otherwise fabricated of clear plastic material having an index of refraction of 1.5, has an array of equi-spaced convex protuberances 14A embossed thereon, each protuberance defining a distinct lenslet. These lenslets 14A serve to enlarge and project onto the rear surface of a screen 16 all of the irradiated data bits in the selected microfiche pattern to produce a viewable illuminated image on the screen. Mask 15 is provided with an array of openings 15A corresponding to the array of lenslets and in optical registration therewith.

As explained previously, in a distributed-optical microfiche, each recorded page is dissected to form a pattern of dispersed characters or data bits, the various page patterns being interlaced to occupy distinct positions on the recording medium. This is illustrated in FIG. 1 in highly simplified form, wherein the recorded page on the microfiche selected for projection, includes the word OBJECT, whose letters or bits are distributed at spaced positions along microfiche emulsion 10. Another record page contains the words CAT IS, and the letters or bits of these words are also carried along emulsion 10 at positions slightly displaced from the letters of the first page.

In operating the reader, the microfiche is inserted between the lens matrix 14 and the base plate 13. Then the light source is energized and the microfiche is indexed to cause the selected image pattern to lie in registration with the optical projection system so that the letters OBJECT are projected. Light passes from light pipes 12 through the transparent base of the microfiche and through emulsion 10 which carries the intelligence. In this way the letters OBJECT are projected through the openings of 15A in mask 15 onto screen 16. In order to view the pattern representing the next page of recorded information on the microfiche, the microfiche is moved to the left by an indexing mechanism, thereby aligning the letters (bits) of CAT IS with the array of lenslets, and projecting this page onto the screen.

Figure 2:
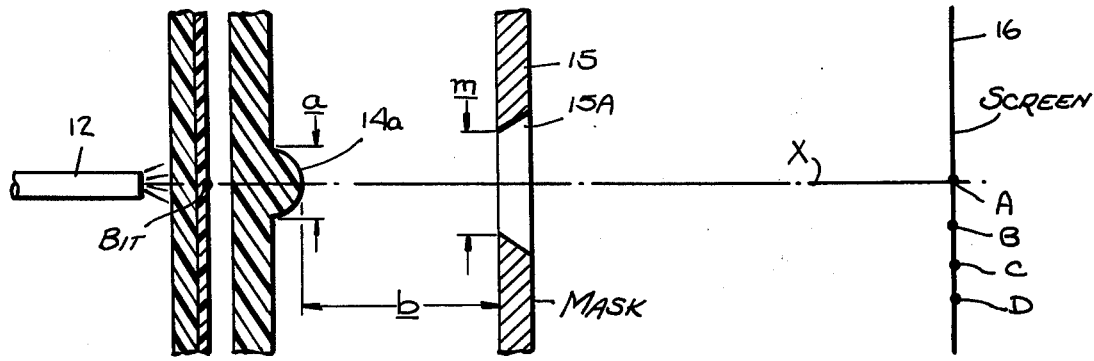
FIG. 2 illustrates the relationship existing between one opening in the mask and the aperture of a lenslet in the lens matrix included in the reader.

We shall now, in connection with FIG. 2, consider the projection of a single bit on microfiche 10 through a lenslet 14A on lens matrix 14, the bit being illuminated by a fiber optical light pipe 12. The enlarged image of the bit is projected through openings 15A in mask 15 onto a zone on the rear surface of screen 16. Lenslet 14A and mask opening 15A are in axial alignment, the optical axis X passing through the bit on the microfiche.

Lenslet 15A has an aperture "a" of a given diameter, the bundle of light rays being limited by this aperture. Mask opening 15A has a given diameter "m" and the mask is spaced by a distance "b" from the peak of lenslet 14A.

Referring now to FIG. 2A, the relationship of lenslet aperture "a" to mask opening "m" is shown as it appears to the eye of an observer looking at screen 16 at an image point A thereon intersected by optical axis X. Image point A is at a zero field angle so that lenslet aperture "a" is seen to the observer as perfectly centered within mask aperture "m." The light rays from aperture "a" in this viewing position are in no way obscured by mask opening "m."

Figure 3:
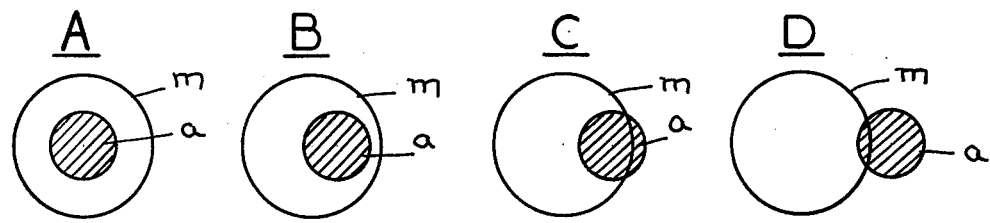
FIGS. 3A, 3B, 3C and 3D show the relationship between the lenslet aperture and the mask opening as seen by an observer at different field angles on the reader screen.

Image point B on screen 16 is slightly displaced from the zero field angle image point A, and the image point B is therefore at a slight field angle. The eye of the observer at image point B now sees the illuminated lenslet aperture "a," as shown in FIG. 3B, somewhat off-center with respect to mask opening "m" but still within this opening; hence the mask still does not obscure the light rays from the lenslet.

But with a further displacement at image point C, the eye of the observer sees most of aperture "a," for now mask "m" opening partially obscures a minor portion of the lenslet aperture, as shown in FIG. 3C. A further displacement at image point D, which represents a relatively large field angle, causes mask opening "m" to almost fully obscure the light from lenslet aperture "a."

Figure 4:
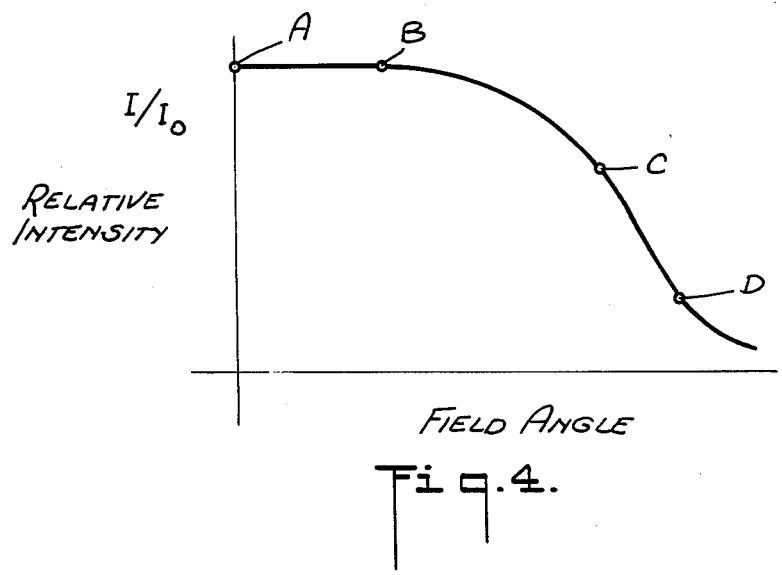
FIG. 4 is a curve showing the relationship between relative light intensity and field angle.

By plotting the light intensity of the rays from aperture "a," as indicated by the cross-hatched area within mask "m" in FIGS. 3A, B and C, as against the field angle at image points A, B, C and D, one produces the graph illustrated in FIG. 4 which shows that the relative intensity $I/I_o$ is at its maximum level at points A and B. This intensity falls off at point C and drops sharply at point D.

As is well known, the light intensity in photographic and projection systems varies as the fourth power of the cosine of the angle of obliquity. This is the obliquity factor $\cos^4 \sigma$. Furthermore, in the context of a reader arrangement in accordance with the invention, the light intensity at image points A, B, C and D, as one goes from a zero field angle to a relatively wide field angle, depends not only on the obliquity factor, but also on the directional characteristics of the screen. The screen directionality factor $S_\sigma$ represents the ratio of screen intensity relative to its value at 0°.

The third factor which comes into play is the area factor $A_\sigma$. As explained previously in connection with FIGS. 2 and 3, the area of the lenslet aperture "a" that is available for the passage of light depends on the diameter "m" of the mask opening and its distance "b" from the lenslet. If the diameter and position of mask opening "m" are known, the value of the area $a_\sigma$ can be calculated, and the ratio $A_\sigma = a_\sigma/a$ can be determined for any obliquity $\sigma$.

Thus the intensity of light $I_\sigma$ from a single lenslet 14A at any angle of obliquity $\sigma$ is determined by three factors and is expressed by the following equation:

$$I_\sigma/I_O = A_o \cdot S_\sigma \cos^4 \sigma \qquad \text{Equation (1)}$$

Figure 5:
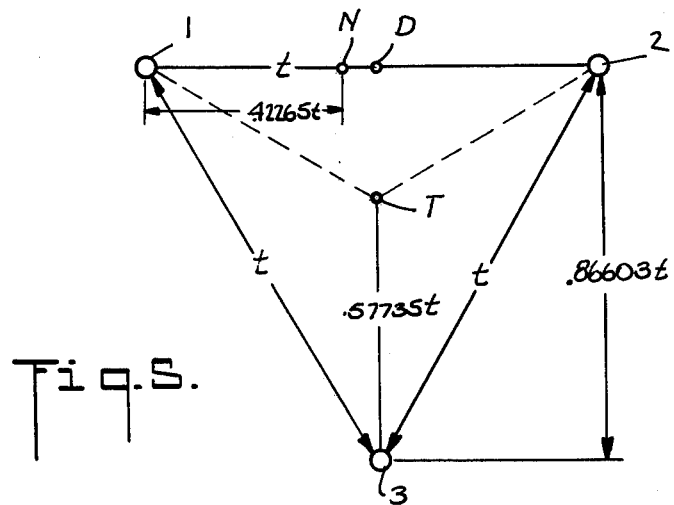
FIG. 5 illustrates a triad of three directly adjacent lenslets.

We shall now, in connection with FIG. 5, consider a triad of three closely adjacent lenslets in the lens matrix. The centers of these lenslets lie at the corners 1, 2 and 3 of an equilateral triangle. The distance between the centers of any two lenslets in the triad is designated t. The triple-point of the triad which is equidistant from all lenslets is designated T, whereas the double-point which lies midway between two lenslets is designated D. Test point N is at a position along the line between lenslets 1 and 2 and is spaced from lenslet 2 by a distance equal to the triple point distance T. Hence test point N is spaced from lenslet 1 by a distance equal to t minus T. Assuming that $t = 1$, the distance between point T and any lenslet center $= 0.57735t$, and the distance between point N and lenslet center $1 = 0.42265t$.

If the light intensity $I_o$ on the screen directly opposite lenslet 1 is assumed to be 100%, with no light thereon from the other lenslets 2 and 3, and if one assumes that the intensity of illumination is determined only by the area factor, then in order to effect uniform illumination of the screen, the following conditions must prevail:

A The screen portion opposite the triple point T must receive 33⅓ from each of the three lenslets;

B The screen portion opposite double point D must receive 50% from each of lenslets 1 and 2; and C The screen portion opposite test point N must receive 66⅔ from lenslet 1 and 33⅓ from lenslet 2.

Figure 6:
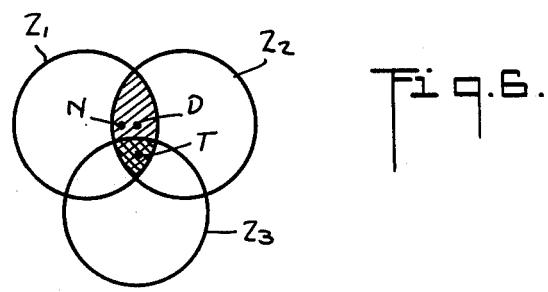
FIG. 6 illustrates the overlapping screen zones produced by the triad of lenslets.

In this way, one achieves 100% illumination in the non-overlapped portions of screen zones $Z_1$, $Z_2$ and $Z_3$ corresponding to lenslets 1, 2 and 3, as well as in the overlapping portions thereof, as shown in FIG. 6. It will be seen in FIG. 6 that all three zones $Z_1$, $Z_2$ and $Z_3$ overlap in the region surrounding triple point T, while in the region surrounding points D and N, only zones $Z_1$ and $Z_2$ overlap, all other zoneal regions being free of overlap.

For any limited configuration, angles $\sigma_D$ and $\sigma_T$ for the double point D and triple point T, respectively, are known. Referring back to equation (1), we can obtain the two values of A at these points. For triple point T:

$$A_T = 0.333/(\cos^4 \sigma_T \cdot S_T)$$

For double-point D:

$$A_D = 0.500/(\cos^4 \sigma_o \cdot S_o)$$

This gives us the two relative areas we need at different field angles. Thus we have at our disposal two mathematical "degrees of freedom" in designing melding mask 15 to effect uniform screen illumination; namely, the diameter "m" of the mask opening and the axial distance "b" from this opening to the associated lenslet, as shown in FIG. 2. Consequently, one has available a solution for these quantities which will yield the required values and which can be determined by computer techniques well known in the art. Point N can be used to test the result. For point N, the relative area is given by the equation:

$$A_N = 0.677/(\cos^4 \sigma_N \cdot S_N)$$

Modern high speed computers make it convenient to determine the parameters of the mask that will match the triple point T and the double point D or the test point N. The procedure is to flood lenslet apertures "a" with a large number of rays equally spaced over the apertures, say, 300 rays. A mask is then placed at some arbitrary distance "b" from the lenslet, and the off-axis ray bundle chosen is that corresponding to triple point T.

The diameter "m" of the mask opening is adjusted so that the proper number of rays is passed by the mask. With an original number of 300 rays, the mask should pass 100 rays at triple point T, modified by an allowance for $\cos^4 \sigma$ fall-off and for screen directionality, both of which factors serve to increase by calculable amounts the number of rays to be passed. In other words, if the only factor were the area factor, then the three overlapping zonal regions at point T would provide $100 \times 3 = 300$, which is 100% illumination.

After diameter "m" has been adjusted to pass the proper number of rays, the field angles are adjusted either to point D or point N and similar counts are made. The ray number required at double point D would be 150, and that at point N, 200 (both with similar modification to allow for the obliquity and screen directionality factors).

Should the number of rays passed at points D or N appear to be incorrect, a new distance "b" is chosen, a new mask opening "m" for the triple point T is determined, and a fresh test is performed at points D or N. In this manner, the triple point T can be matched correctly with one of the other points. The best determination is that which comes closest for the requirements for both points D and N. Acceptable results can be obtained empirically by trial and error for different values of "m" and "b." In practice, it is not essential that all points on the screen have precisely the same intensity of illumination, and approximate matching is adequate for most purposes in order to avoid honeycomb illumination effects.

While there has been shown and described a preferred embodiment of a distributed-optical microfiche reader in accordance with the invention, it will be appreciated that many changes and modifications may be made therein without, however, departing from the essential spirit thereof.

I claim:

1. A reader for a distributed optical microfiche in which each page or document of recorded intelligence is constituted by a reduced scale image thereof dissected to form a pattern of dispersed bits, said reader comprising:

A. a viewing screen;
   B. means to illuminate the bits in the recorded pattern on the microfiche;
   C. a planar lens matrix formed by an array of equidistant identical lenslets having a predetermined aperture diameter, each lenslet being optically aligned with a respective microfiche bit to enlarge and project this bit onto a zone of said screen, every three directly adjacent lenslets in said array forming a triad in which the centers of the lenslets lie at the corners of an equilateral triangle; and D. a planar apertured melding mask interposed between the lens matrix and the screen and having an array of identical openings corresponding to the array of lenslets and optically aligned therewith, the peaks of said lenslets in said array lying in a common plane that is spaced a predetermined distance from the obverse face of the mask, the diameter of each mask opening, the diameter of the aperture of the associated lenslet and said distance having respective values resulting in three illuminated screen zones associated with each triad of directly adjacent lenslets, which zones are in partially overlapping relationship to a degree producing substantially equal light-intensities within the overlapping and non-overlapping regions therein, thereby uniformly illuminating the screen image, said triad having a triple point equidistant from all three lenslets and a double point midway between a pair of adjacent lenslets, the diameter of each mask opening and its distance from the related lenslet being adjusted so that the screen portion opposite the triple point receives $33\frac{1}{3}\%$ of its light intensity from each of the three lenslets in the triad and the screen portion opposite the double point receives 50% of its light from each of the pair of adjacent lenslets, said triad having a test point along a line joining a pair of adjacent lenslets at a position spaced from one of these lenslets a distance equal to said triple point distance, the portion of said screen opposite said test point receiving $33\frac{1}{3}\%$ of its light from said one of said lenslets and $66\frac{2}{3}\%$ from the other of said lenslets in the pair thereof.

2. A reader as set forth in claim 1, wherein said microfiche is illuminated by a cluster of fiber optic light pipes whose input terminals are irradiated by a common source and whose output terminals produce light beams which are applied to the respective bits of the pattern.

3. A reader as set forth in claim 1, wherein said screen has directional characteristics and wherein said mask opening diameter and said distance between the mask opening and the lenslet are adjusted to take said directional characteristics into account.

4. A reader as set forth in claim 1, wherein the intensity of light at any point in the screen is governed by the relative areas of the lenslet aperture and the mask opening, the obliquity factor and the screen directionality factor, and said mask diameter and said mask distance from the lenslet are adjusted in the light of these factors.

5. A reader as set forth in claim 1, wherein the percentages of light received at said triple point and at said double point are adjusted to allow for the directional characteristics of said screen and the obliquity factor.

6. A reader as set forth in claim 1, wherein the percentage of light received at said test point is adjusted to allow for the directional characteristics of the screen and the obliquity factor.

* * * * *